United States Patent Office.

OTTO FISCHER, OF MUNICH, BAVARIA, GERMANY.

PROCESS OF PREPARING COLORING-MATTER.

SPECIFICATION forming part of Letters Patent No. 248,154, dated October 11, 1881.

Application filed March 19, 1881. (Specimens.)

*To all whom it may concern:*

Be it known that I, Dr. OTTO FISCHER, a subject of the King of Bavaria, and a resident of Munich, in the Kingdom of Germany, have invented an Improved Process of Manufacturing the Leuco-Base of Rosaniline, of which the following is a specification.

The object of my invention is the production of the leuco-base of rosaniline by the reaction of the para-amidobenzaldehyde on aniline. By "aniline" I understand the mixture of real aniline with toluidine. This leuco-base, as is well known to chemists, can be converted into rosaniline by oxidizing agents.

The process is explained by the following formula:

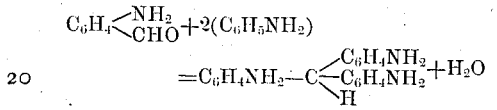

Para-amidobenzaldehyde aniline tri-amidotriphenylmethan — (para-leucaniline) plus water.

The para-amidobenzaldehyde is produced by reducing the para-nitrobenzaldehyde by means of tin dichloride and muriatic acid in aqueous solution, or also by means of tin, iron, or zinc in an alcoholic solution containing muriatic or acetic acid.

In the following example I explain the production and subsequent treatment of the para-amidobenzaldehyde.

I dissolve ten parts of para-nitrobenzaldehyde in fifty parts of alcohol, and I add fifty parts of muriatic acid. To this solution I gradually add twelve parts of zinc powder, and then heat this until the zinc is dissolved. Afterward the alcohol is distilled off and the yield thickened on a water bath. The product thus obtained is heated to 120° to 140° centigrade (248° to 284° Fahrenheit) with seventeen parts of chlorhydrate of aniline and ten parts of solid zinc chloride. From the smelt thus obtained I separate the leuco-base in a manner well known to chemists, and I oxidize the same to rosaniline by well-known oxidizing agents, such as manganese dioxide or lead dioxide or chloranil.

In the process above described the hydrochlorate of aniline may be replaced by the sulphate of aniline.

I claim as my invention—

1. The mode herein described of producing the leuco-base of rosaniline—that is, by the reaction of para-amidobenzaldehyde on aniline, or a mixture of aniline with toluidine, substantially as specified.

2. The mode herein described of producing the leuco-base of rosaniline—that is, by first dissolving para-nitrobenzaldehyde in alcohol and muriatic acid, then adding zinc powder and distilling the alcohol off, then heating this product with zinc chloride and chlorhydrate of aniline, or its described equivalent, and finally separating the leuco-base from the compound, substantially in the manner and proportions set forth.

In testimony whereof I have signed my name to this specification in the presence of two subscribing witnesses.

OTTO FISCHER.

Witnesses:
CHARLES J. BELL,
KARL BUCHKA.